United States Patent [19]

Whitehouse

[11] 4,219,174
[45] Aug. 26, 1980

[54] WIRING CLIP

[75] Inventor: Martin H. Whitehouse, Northmead, Australia

[73] Assignee: Byrne & Davidson Doors (N.S.W.) Pty. Limited, Revesby, Australia

[21] Appl. No.: 5,685

[22] Filed: Jan. 23, 1979

[30] Foreign Application Priority Data

Jan. 26, 1978 [AU] Australia .............................. PD3151

[51] Int. Cl.² ........................................... F16B 15/00
[52] U.S. Cl. ................................... 248/71; 248/74 A; 248/205 A
[58] Field of Search .................... 248/71, 74 R, 74 A, 248/205 A; 174/40 CC; 24/73 B, 73.5 A

[56] References Cited

U.S. PATENT DOCUMENTS

| 2,385,296 | 9/1945 | Moore | 248/74 R |
| 3,074,677 | 1/1963 | Eckhardt | 248/205 A |
| 3,175,262 | 3/1965 | Wilson | 174/40 CC |
| 3,491,971 | 1/1970 | Fisher | 248/205 A |

FOREIGN PATENT DOCUMENTS

| 481707 | 7/1927 | Fed. Rep. of Germany | 248/71 |
| 93771 | 12/1938 | Sweden | 248/71 R |

*Primary Examiner*—James T. McCall
*Attorney, Agent, or Firm*—Stevens, Davis, Miller & Mosher

[57] ABSTRACT

The curtain sheet of a roll-up type garage door is furnished with resilient anti-rattle strips. A safety switch operated by a striker bar at the edge of the sheet is connected to the power operating mechanism for the door by conductors held in place by clips having detent barbs interposed between the sheet and the strips.

4 Claims, 2 Drawing Figures

WIRING CLIP

BACKGROUND OF THE INVENTION

This invention relates to electrically operated roller doors and more particularly to those doors provided with noise and friction reducing strips secured to the inside and outside of each vertical edge margin of the door curtain.

Electrically operated roller doors have suffered from the disability of being potentially dangerous while the curtain is travelling in the downward direction since the curtain may strike an object or person inadvertently positioned in the path of the door curtain, so causing damage to either the driver motor, the door or the obstruction.

To obviate this problem switching means have been proposed attached to the leading edge of roller door curtains so as to render inoperative, or reverse, the electric drive of the door when the curtain strikes an obstruction.

This raises the problem of connecting the switching means to the drive motor since the connecting wire must be securely and inexpensively attached to the curtain.

One reason why the introduction of switching means to the leading edge or roller door has been delayed has been the difficulty encountered in connecting the switching means to the drive means.

The present invention relates to an attaching device to hold electrical connecting wires securely to the curtain sheet of a roller door.

SUMMARY OF THE INVENTION

Thus, the present invention consists in a conductor affixing clip comprising a U-shaped body portion, an open ended trough-like appendage on the crotch region of said body portion for receiving the conductors, and detent means on each of the leg portions of the body adapted to engage between a roller curtain and a noise and friction reducing strip affixed to said curtain.

DESCRIPTION OF PREFERRED EMBODIMENT

Figure 1:
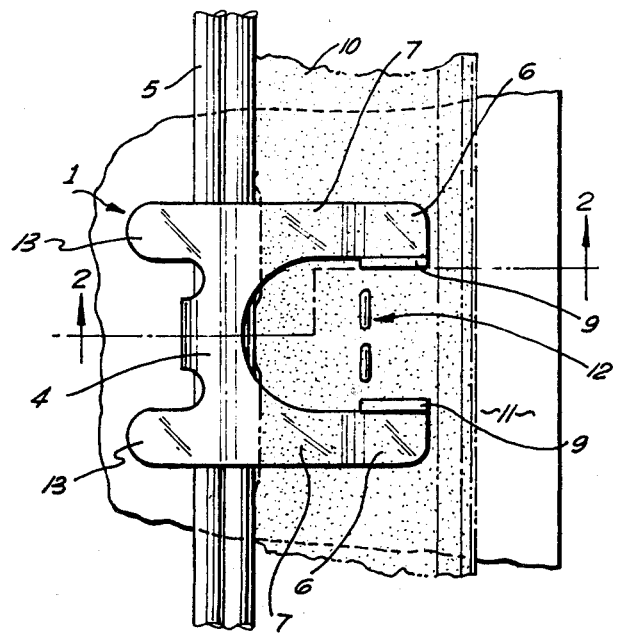
FIG. 1 is a side elevation of a clip according to the invention showing it in use on a roller door curtain.
Figure 2:
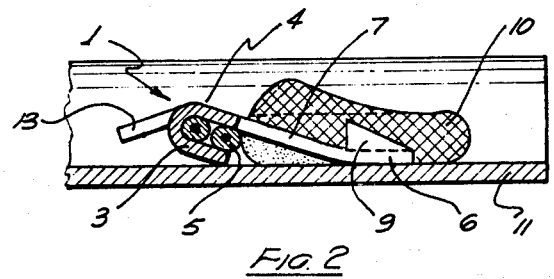
FIG. 2 is a view taken on line 2—2 of FIG. 1.

This preferred embodiment comprises a clip 1 having a substantially flat U-shaped body comprising a crotch portion 4 and leg portions 7. A turned over open-ended trough-like appendage 3 projects from the crotch portion 4 of the body for receiving and holding conductors 5. Each leg portion 7 has an inclined tip 6 on its free end.

Detent means are provided on the tips 6 in the form of a projecting barb 9 on each tip, shaped to slide between a soft resilient strip 10 mounted on the edge of a roller door curtain 11 in one direction and to prohibit movement in the opposite direction by engagement with the resilient strip.

The leg portions 7 are adapted to straddle a connecting means, such as a staple 12, fixing the noise and friction reducing strips 10 to the curtain 11. When in position, as illustrated, the tips 6 lie flatly against the roller door curtain. The trough-like appendage 3 engages about the conductors 5, and is held in contact with the curtain 11 by the strip 10.

Conductor guiding means consisting of inclined lugs 13 extending from crotch region 4 may also be provided so as to maintain the conductor 5 in proximity to the door curtain 11 thereby protecting the conductors 5 from the possibility of being damaged by flexure at its point of emergence from the appendage 3 during the raising and lowering of the door curtain.

Furthermore, when the clip is in the operative position, the conductors are held in abutment against the noise and friction reducing strip and are thereby rendered immobile and are protected by the strip against damage during the rolling and unrolling of the roller door.

Although the invention has been described with reference to a specific example, it will be appreciated that the invention may be embodied in many other forms.

I claim:

1. A conductor affixing clip comprising a generally flat U-shaped body portion, having at least two legs and a crotch portion therebetween, an open ended trough like appendage on the crotch region for receiving at least one conductor, and detent means on each of the leg portions of the body adapted to engage between a roller curtain and a noise and friction reducing strip affixed to said curtain.

2. A clip as claimed in claim 1 wherein the detent means comprise projecting barbs on the tips of the leg portions of the body.

3. A clip as claimed in either claim 1 or claim 2 wherein conductor guiding means are provided to prevent flexure of the conductor where it emerges from said appendage.

4. In combination, a roller door having a curtain, an anti-rattle strip thereon, a conductor affixing clip for securing a wire to said curtain along said anti-rattle strip, said clip comprising a generally flat substantially U-shaped body having at least two legs and a crotch portion therebetween; an open ended trough-like appendage on the crotch portion for receiving at least one conductor; detent means on each of the leg portions engaging between said curtain and said anti-rattle strip.

* * * * *